US006894690B2

(12) United States Patent
Capers

(10) Patent No.: US 6,894,690 B2
(45) Date of Patent: May 17, 2005

(54) METHOD AND APPARATUS FOR CAPTURING AND VIEWING A SEQUENCE OF 3-D IMAGES

(75) Inventor: Walter E. Capers, Highland, MI (US)

(73) Assignee: Engineering Technology Associates, Inc., Troy, MI (US)

(*) Notice: Subject to any disclaimer, the term of this patent is extended or adjusted under 35 U.S.C. 154(b) by 663 days.

(21) Appl. No.: 09/885,218

(22) Filed: Jun. 20, 2001

(65) Prior Publication Data

US 2003/0011604 A1 Jan. 16, 2003

(51) Int. Cl.[7] .............................................. G06T 15/00
(52) U.S. Cl. ...................................................... 345/473
(58) Field of Search ................................ 345/522, 423, 345/473, 419, 474, 475

(56) References Cited

U.S. PATENT DOCUMENTS

| 5,111,409 A | 5/1992 | Gasper et al. ............ 715/500.1 |
| 5,247,651 A | 9/1993 | Clarisse ........................ 703/13 |
| 5,442,456 A | 8/1995 | Hansen ........................ 386/106 |
| 5,537,157 A | 7/1996 | Washino et al. ............. 348/722 |
| 5,555,354 A | 9/1996 | Strasnick et al. ............ 345/727 |
| 5,577,180 A | 11/1996 | Reed ............................ 345/634 |
| 5,655,117 A | 8/1997 | Goldberg et al. ........... 707/102 |
| 5,671,381 A | 9/1997 | Strasnick et al. ............ 715/848 |
| 5,684,935 A | 11/1997 | Demesa, III et al. ........ 345/419 |
| 5,724,605 A | 3/1998 | Wissner .................... 715/500.1 |
| 5,727,141 A | 3/1998 | Hoddie et al. ............... 345/475 |
| 5,745,738 A | 4/1998 | Ricard ......................... 703/13 |
| 5,759,044 A | 6/1998 | Redmond ............... 434/307 R |
| 5,777,621 A | 7/1998 | Schneider et al. ........... 345/428 |
| 5,815,604 A | 9/1998 | Simons et al. ............... 382/250 |
| 5,841,432 A | 11/1998 | Carmel et al. ............ 715/500.1 |
| 5,872,575 A | 2/1999 | Segal ........................... 345/473 |
| 5,892,915 A | 4/1999 | Duso et al. .................. 709/219 |
| 5,907,704 A | 5/1999 | Gudmundson et al. ..... 717/100 |
| 5,923,334 A | 7/1999 | Luken .......................... 345/423 |
| 5,977,978 A | 11/1999 | Carey et al. ................. 345/419 |
| 5,986,667 A | 11/1999 | Jevans ......................... 345/619 |
| 6,009,190 A | 12/1999 | Szeliski et al. ............. 382/154 |
| 6,031,541 A | 2/2000 | Lipscomb et al. .......... 345/420 |
| 6,184,908 B1 * | 2/2001 | Chan et al. .................. 345/522 |
| 6,429,867 B1 * | 8/2002 | Deering ....................... 345/423 |

FOREIGN PATENT DOCUMENTS

| EP | 0772119 | 5/1997 |
| EP | 0930584 | 7/1999 |
| WO | WO 97/31305 | 8/1997 |
| WO | WO 97/31445 | 8/1997 |
| WO | WO 99/10822 | 3/1999 |
| WO | WO 00/10663 | 3/2000 |

OTHER PUBLICATIONS

Rule, "3D Graphics File Formats" 1996, pp 1,5,8,11, 25,28, 36–40,47,200.*

VRML97, http://www.vrml.org/Specifications/VRML97/part1/nodesRef.html, 1997.*

* cited by examiner

*Primary Examiner*—Phu K. Nguyen
(74) *Attorney, Agent, or Firm*—Harness, Dickey & Pierce, P.L.C.

(57) ABSTRACT

A method and apparatus for producing a 3-D image file. In a preferred embodiment, the 3-D image file is produced using a source including a set of graphics instructions. The source data is produced, for example, by translating a data set into graphics instructions by a translation application. The graphics instructions are then converted into movie file commands by a graphics converter. In a preferred embodiment, the graphics instructions are converted by a set of procedures which contain storage and display information for each of the graphics instructions. Each command corresponds to a specific graphics instructions, and contains information for instructing a display software application to display a characteristic of a 3-D image. The commands are then recorded in the output 3-D image file.

37 Claims, 6 Drawing Sheets

METHOD AND APPARATUS FOR CAPTURING AND VIEWING A SEQUENCE OF 3-D IMAGES

FIELD OF THE INVENTION

This invention relates to three-dimensional (3-D) computer images, and more particularly, to the generation, transmission, and viewing of 3-D movies that can be viewed from multiple vantage points.

BACKGROUND OF THE INVENTION

A three-dimensional (3-D) image as discussed in the present invention is an image that is viewable in two dimensions, but can be manipulated such that a user can view it from different viewpoints so as to simulate viewing in three dimensions. Viewing 3-D images on a computer is becoming increasingly important. Being able to view an image in three dimensions allows a viewer to extract a great deal more information from that image. Rotating an image so as to view it from several different angles can make relationships and dependencies instantly clear, where it may be very difficult to do so otherwise. For example, consider an image of an automobile crashing into a wall. Rotating that image to allow a viewer to see the image from different angles allows that viewer to observe in three-dimensions how the automobile behaves in such a collision. It also provides a considerable time savings, as the user will not have to iterate through several two-dimensional views to gather the same information.

A 3-D movie consists of a series of images or frames displayed in a sequence. A 3-D movie provides the further benefit of being able to observe an event in three-dimensions with respect to time. In the automobile crash example, for instance, the viewer could observe the effects on different parts of the automobile in three-dimensions, and see at what point in time events occur. By watching this 3-D movie, the user could estimate how safe a vehicle is by simulating a crash, and observing how the vehicle behaved in the crash with respect to time.

Several ways of creating and viewing graphics exist today. For example, it is possible to view an image in three-dimensions using the concept of voxels. A voxel is a 3-D pixel, describing a piece of information at a given point in 3-D space. A 3-D image consisting of voxels is a 3-D matrix of these pieces, such that there is a voxel for each point in the 3-D space of the image. As such, images composed of voxels have the potential of being extremely large, sometimes on the order of millions, or tens of millions, of pieces of data. This results in difficulty in processing a series of images. Additionally, transmission and space limitations can also arise. Voxels are often used for analyzing scientific or medical data, such as a 3-D image created out of a series of two-dimensional computed tomography (CT) images. This allows a user to view a multitude of two dimensional slices out of a single 3-D image.

Another way of creating and viewing graphics is by using the Virtual Reality Modeling Language (VRML). VRML is a language used to describe a virtual world. VRML is a high level language such that a group of VRML commands maps to a group of graphics instructions, not necessarily on a one to one basis. A file written in this language instructs a computer on how to build 3-D geometric objects. However, a VRML file is an ASCII file, and as such, has the potential to be very large. This presents problems in efficient transmission of large series of 3-D images over networks. Additionally, it is necessary to have VRML specific viewing software, such as a plug in for an Internet browser, to translate the VRML file into graphics instructions (described below) that can be rendered by a rendering tool. Furthermore, writing VRML files requires learning the VRML language, which can require a considerable investment of time.

It is useful in analyzing data as well as in presenting and explaining data, to display the data in a movie form. For example, it is useful to attach a movie to an electronic document or presentation. This enhances the recipient's understanding of the information conveyed by the document or presentation. Several protocols have been developed for viewing a series of images in sequence, in the form of a movie. Examples of these are AVI and MPEG technology. However these technologies display a series of two dimensional images in sequence, and as such limit the user in that the vantage point for viewing the movie cannot be changed.

Another way of creating 3-D images is to use common graphics libraries such as OpenGL or PHIGS. These libraries provide an interface to the graphics hardware of the computer. Generally, these libraries contain procedures and functions that allow a programmer to describe simple geometry and geometric manipulations. The result is instructions on how to build 3-D-images. A 3-D movie can consist of a sequence of these images. The advantage of using this method of creating 3-D images is that it is not necessary to specify a value of each point in 3-D space, as is done in rendering a voxel image. It is sufficient to specify how that image is to be drawn by a rendering tool.

Typically, one interfaces with a graphics library such as OpenGL by first writing a file with information, such as coordinates of objects, pertaining to the image to be rendered. This information is then translated into OpenGL calls by an application, for example FEMB, Hypermesh, or Pro Engineer. In general, these applications are company specific and proprietary, and thus expensive to obtain. Furthermore, they often provide much more functionality than just image viewing, which may be unneeded by someone who just needs to view the output. A series of images can be viewed sequentially from a multitude of viewpoints using this type of application. However, in order to send the series of images to one who does not own the application, it is necessary to capture the output of the application in a standard two-dimensional movie file format such as AVI.

Thus such approaches do not provide a way of efficiently storing and transferring sequences of 3-D images composed of graphics instructions. They also do not provide a way of storing and transmitting a series of 3-D images that is easy for a user to learn, and, for example, does not require learning an extensive new language.

SUMMARY OF THE INVENTION

The present invention overcomes the aforementioned disadvantages as well as others. The present invention provides a method and apparatus for producing a 3-D image file. In a preferred embodiment, the 3-D image file is produced using a source including a set of graphics instructions. The source data is produced, for example, by translating a data set into graphics instructions by a translation application. The graphics instructions are then converted into movie file commands by a graphics converter. In a preferred embodiment, the graphics instructions are converted by a set of procedures which contain storage and rendering information for each of the graphics instructions. Each command corresponds to a specific graphics instruction, and contains information for instructing a display software application to display a characteristic of a 3-D image. The commands are then recorded in an output file

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
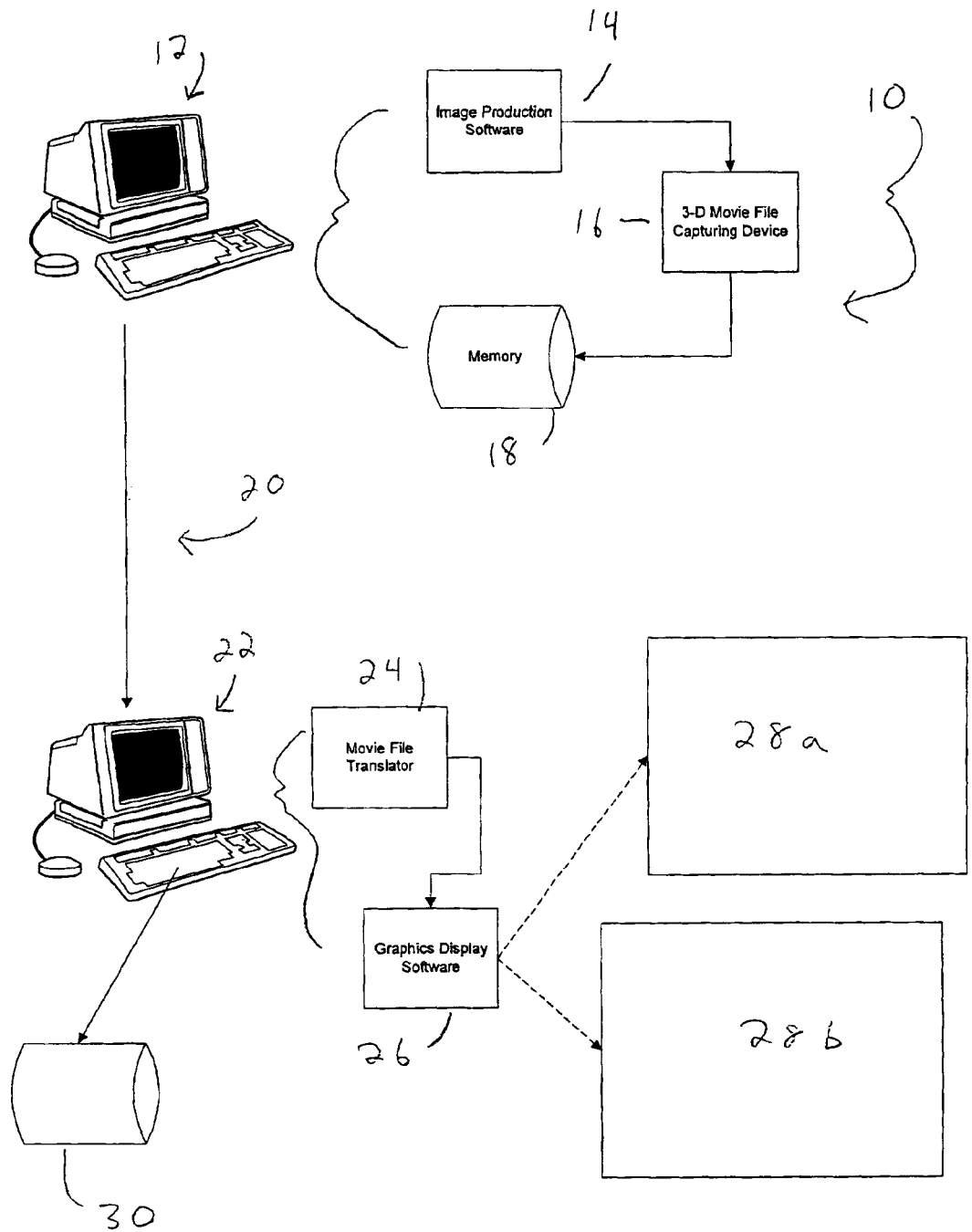
FIG. 1 provides a block diagram of the system employed to create, transmit, and view 3-D image files in accordance with the present invention.

With reference to FIG. 1 of the drawings, there is shown a method and apparatus for capturing and storing 3-D imagery. In accordance with a preferred embodiment of the present invention, a system for capturing and viewing 3-D imagery 10 includes an image production terminal 12. At the image production terminal 12, a user produces an image using image production software 14. The output of the image production software is captured by a 3-D movie file capturing device 16, after which it is stored in a computer memory 18 as a file. The file is then transferred over a network 20 such as the Internet to a viewing terminal 22. At the viewing terminal 22, a movie file translator 24 translates the file into graphics instructions which are used by a graphics display software 26 such as a graphics rendering tool, which can display the 3-D movie such that it can be viewed from multiple viewpoints 28 (a), (b). Alternately the movie file can be stored in a computer memory 30.

Figure 2:
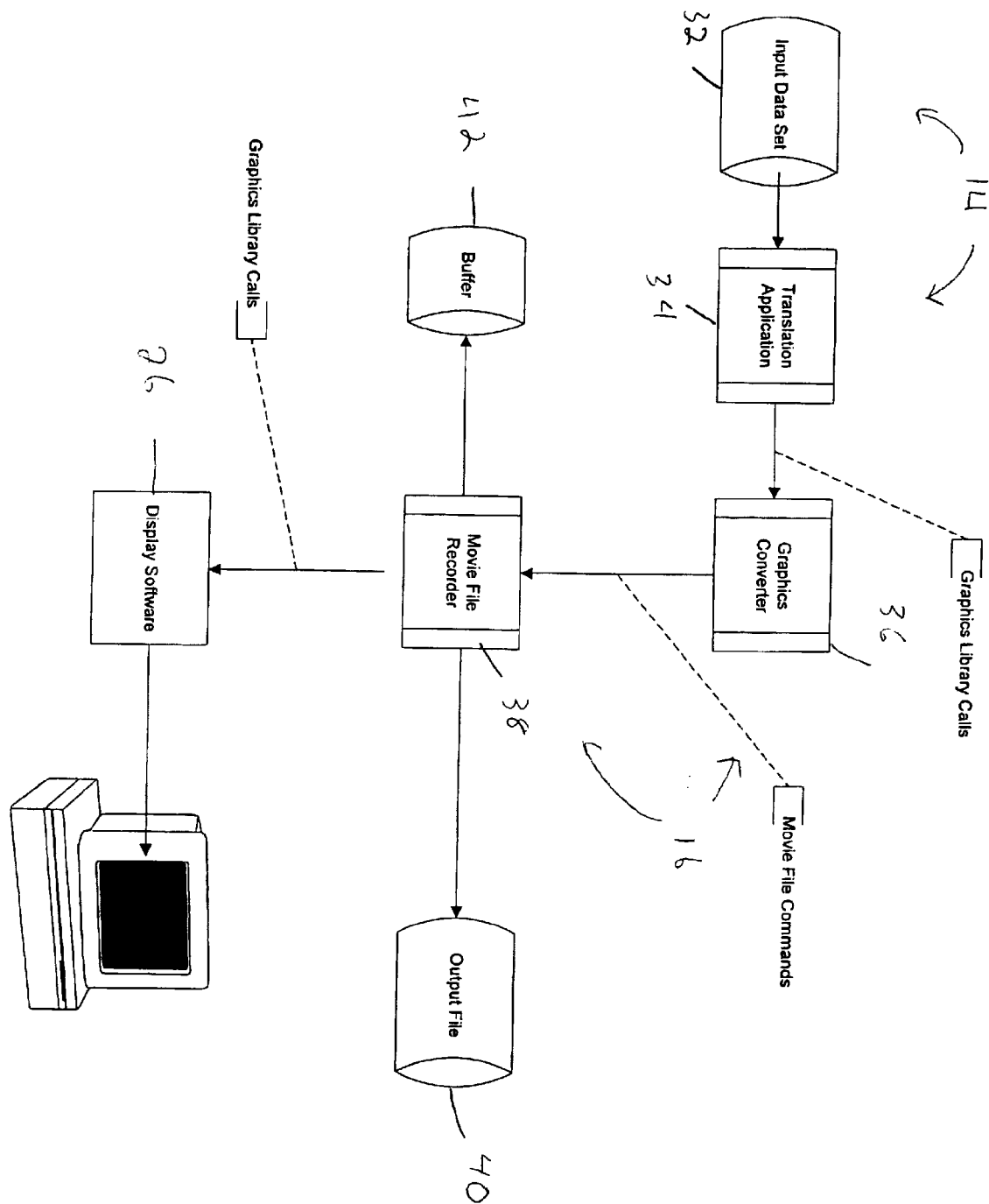
FIG. 2 provides a block diagram of an apparatus for creating and storing 3-D imagery in accordance with a preferred embodiment of the present invention.
Figure 3:
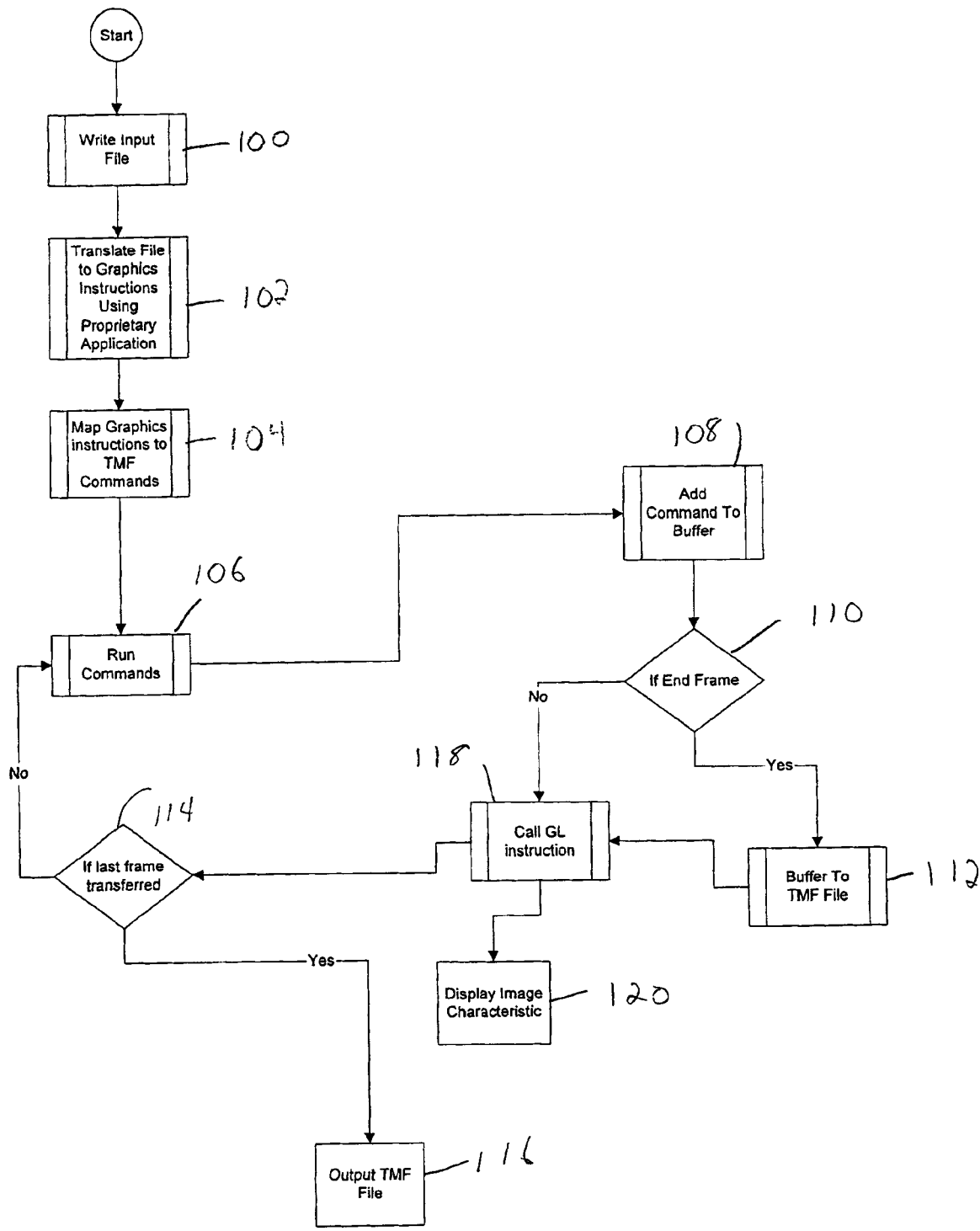
FIG. 3 is a flowchart of a method of transferring 3-D imagery from a source to a target in accordance with the present invention.

With reference to FIG. 2 and FIG. 3, production of a 3-D imagery using image production software 14 includes inputting a data set 32 containing information for creating the imagery, such as coordinate information, into a translation application 34 as in step 100. In a preferred embodiment, this translation application 34 is a proprietary application such as FEMB or Hypermesh. The translation application 34 translates the input data set 32 into graphics instructions as in step 102. In a preferred embodiment, those graphics instructions are Open GL calls. One skilled in the art will recognize that a multitude of other graphics libraries such as PHIGS, for example, are within the scope of the present invention. The graphics instructions are intercepted by the 3-D movie file capturing device 16, which includes a graphics converter 36 and a movie file recorder 38. The graphics converter 36 maps the graphics instructions into 3-D movie file commands as in step 104. The movie file recorder 38 then records the commands and stores them in an output 3-D movie file (TMF) 40.

In a preferred embodiment of the present invention, the movie file capturing device 16 is a library and library header file that the translation application 34 links to in place of the graphics library and corresponding header file. The movie file library and library header file contains information that enables a compiler to map graphics instructions to movie file commands as in step 104. For instance, if the application normally links to an OpenGL library, the movie file library would contain information on mapping functions such as glVertex3f to movie file functions such as TMF_glVertex3f. In a previous application, the library header file contains information on how prototypes of each function are structured and the arguments that they take. The previously mentioned function would be structured as:

void glVertex3f(GLfloat, GLfloat, GLfloat);

In the corresponding movie file library header file, the same function would be replaced by a movie file function as in step 104. In C, this would be implemented by:

define glVertex3f TMF_glVertex3f

The function prototype is then defined as:

void TMF_GLVertex3f(GLfloat, GLfloat, GLfloat);

For example, to implement a rectangle in 3-D space, a programmer would write an OpenGL rectangle as:

```
glBegin(GLQUAD);
    glVertex3f(1.0,0.0,0.0);
    glVertex3f(1.0,1.0,0.0);
    glVertex3f(0.0,1.0,0.0);
    glVertex3f(0.0,0.0,0.0);
glEnd():
```

During compilation, this would be automatically replace by:

```
TMF_GLBegin(GLQUAD);
    TMF_GLVertex3f(1.0,0.0,0.0);
    TMF_GLVertex3f(1.0,1.0,0.0);
    TMF_GLVertex3f(0.0,1.0,0.0);
    TMF_GLVertex3f(0.0,0.0,0.0);
TMF_GLEnd();
```

Therefore, a programmer does not have to significantly modify the application other than substituting a library in order to produce the movie files of the present invention.

As the compilation process continues, the application 34 is linked to the movie file library that contains the functions called in the application. The functions contain information for mapping the movie file function calls to movie file commands and writing it to a stream. The stream is either a file 40 or a buffer 42 that will be transferred to the file 40. For example, a function mapping the glVertex3f command is:

```
void TMF_GlVertex3f(float *arg0)
{
    TMFHandle CommHandle=NULL;
    TMFHandle OpenedStream=tmfGetOpenStreamHandle();
    if(OpenedStream) {
        if(tmfGetCurrentStreamTyp()==_OpenGL_) {
            CommHandle=
                tmfGetCommandHandle(_glVertex3f_,1,
                (TMFInt)sizeof(float)*3,1,arg0);
            if(!CommHandle)
                tmfSetIOError("Could not allocate command
                    handle");
            else{
                if(!tmfBufferCommand(OpenedStream,
                    CommHandle)){
                    tmfSetIOError("Could not append
                        _OpenGL_stream");
                }
            }
        }
    }
}
```

-continued

```
    glVertex3f(arg0);
}
```

In particular, the command tmfGetCommandHandle maps the graphics library function glvertex3fv to the movie file command by building a structure containing an integer representation of the graphics instruction, in this case designated by _glVertex3fv_; a command size, in this case represented by (TMFInt)sizeof(float)*3; and the arguments to the graphics instruction, in this case the array arg0. Thus, in a preferred embodiment of the present invention, when the application 34 is executed as in step 106, the functions write the TMF commands to the buffer 42 as in step 108. When the end of the frame is reached, as in step 110, the commands in the buffer are transferred to the TMF output file 40 as in step 112. When the last frame of the movie is transferred to the buffer as in step 114, the TMF file 40 is output as in step 116.

In another preferred embodiment, the function also calls the corresponding OpenGL instruction, as in step 118. In the example above, this takes place when the function calls glVertex3f(arg0). Thus the capturing device allows the application to write movie file commands to a file 40 at the same time that the corresponding graphics instructions are being rendered by the graphics display software 26, as in step 120.

Figure 4:
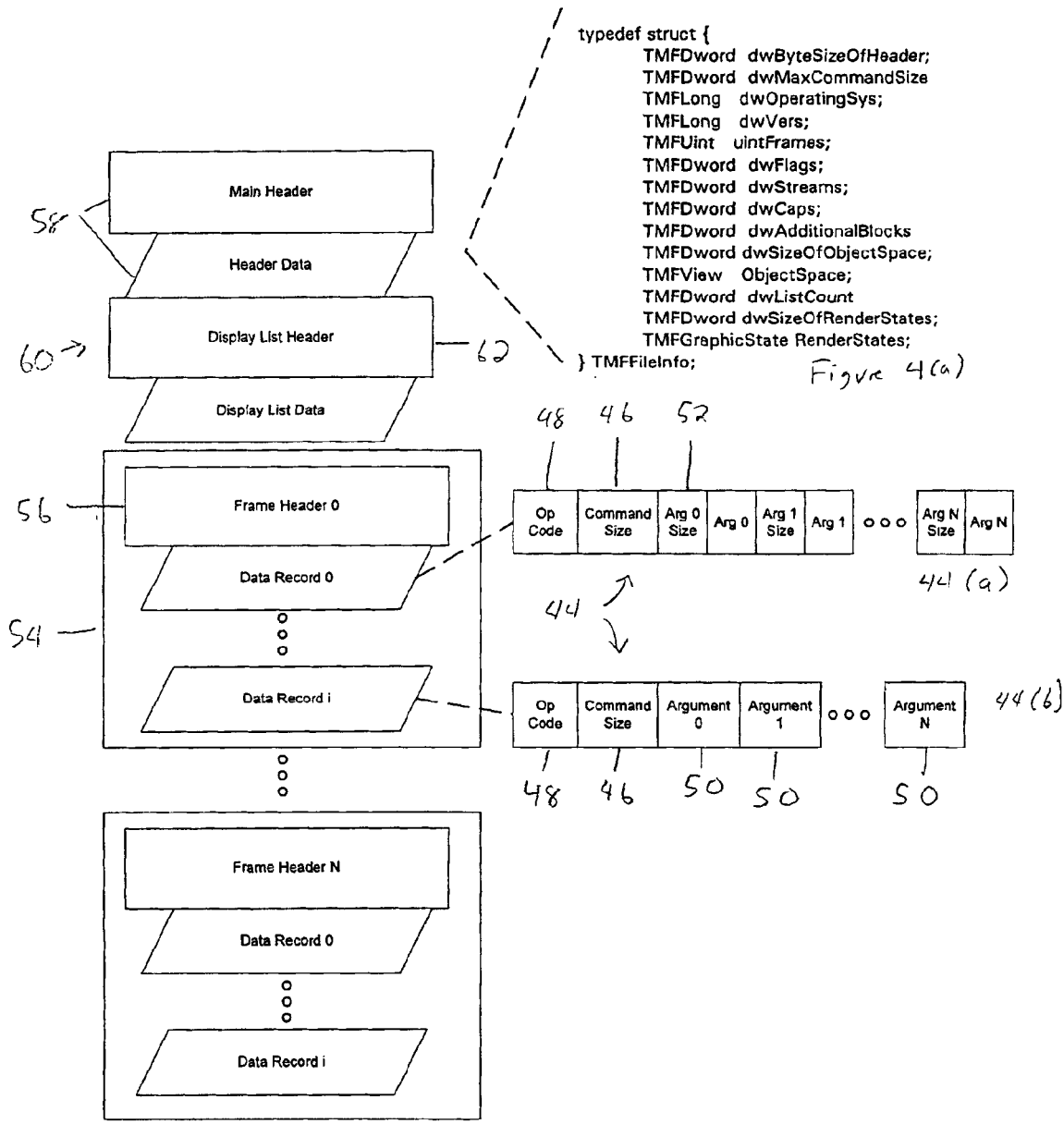
FIG. 4 is a block diagram of a 3-D movie file in accordance with a preferred embodiment of the present invention.

As previously mentioned, with reference to FIG. 4, in a preferred embodiment of the present invention, the graphics instructions are captured as movie file commands 44, which each include an op-code, or integer representation of the type of graphics instruction, information about the size and type of the arguments that the graphics call requires, and the actual arguments for the graphics instruction. There can be a plurality of the arguments, depending on which graphics instruction is being represented. The 3-D movie command 44 is a data record including a field for the size of the command 46, a field for the op-code 48, and fields for any arguments the graphics instruction requires 50. The command 44(*a*) also includes an argument size data field 52 containing combined information about the size of the argument and the type of the argument. Alternately, the command 44(*a*) includes a separate argument size data field (not shown) for each argument 50 including only the size of the argument and a separate argument type data field (not shown) for each argument including the type of the argument. The argument data fields 50 themselves can include single items or arrays of items.

In one preferred embodiment of the present invention, a series of graphics instructions represent a series of characteristics that the rendering software uses to render an image frame. An image frame 54 as represented by the movie file of the present invention includes a series of movie file commands 44. Thus, the TMF file 40 includes at least one frame 54 and each frame includes at least one 3-D movie command 44, which includes information for rendering a characteristic of the frame. Alternatively, the output file also includes a frame header 56 corresponding to each frame 54, containing general information about the frame, such as the size of the frame.

In a preferred embodiment, the TMF file 40 also includes a main header 58, containing general information about the entire file, such as the number of frames 54 contained in the file and the type of operating system used to produce the file. An example of a movie file main header 58 is provided in FIG. 4(*a*). The file header is defined by a C structure with several fields. Explanations of each of the fields in the example header are included in the section Header Description. The main header can be expanded to include more fields, allowing for more flexibility. In another preferred embodiment of the present invention, the argument size and the argument type information are stored in the main header 58 instead of in fields in the commands 44 for commands 44 with arguments of static size and type. This allows for more efficient storage and transmission of the TMF file 40.

In a preferred embodiment, the TMF file 40 further includes a display list 60. The display list 60 is used to efficiently represent image characteristics that are to be displayed in a plurality of frames 54. The display list 60 is a list of instructions that are stored by a graphics server such as could be employed to run the graphics display software 26 that can be recalled and displayed by calling the instruction in the list by a corresponding numerical identifier. For example a display list 60 could be used to define a simple primitive such as a sphere or a cube. In such an example these items could be called and repositioned to define many more complex geometric objects that are based on these primitives. Using the display list 60 avoids including redundant information in the plurality of frames 54, thus providing benefits such as storage space and transmission bandwidth savings. Each display list block begins with a display list header 62. The display list header 62 identifies the size of the block and the identifier of the display list 60 as it is stored on the graphics server. A TMF file 40 may or may not contain a display list 60.

Although the preferred embodiments described here have used the C programming language and OpenGL graphics library, one skilled in the art will recognize that a multitude of other programming languages and graphics libraries can be substituted for those in the preferred embodiment. For each graphics library supported, there is a movie file header file or files and for each graphics call there is a corresponding movie file function that takes the same number of arguments and returns the same values.

After a TMF file 40 is created, in one preferred embodiment of the present invention, TMF files 40 are transferred from one point to another by streaming the data. In streaming TMF files 40, a data stream is defined as a block of data that may or may not contain commands with integer references to graphics instructions. Each stream includes a stream header. The stream header defines the size of the data contained in the stream, the type of stream that follows the header definition, and additional information that tells the TMF library how to render the stream. A single frame may contain many streams. The number of streams that exist in a frame is determined by the main header 58 of the TMF file 40. In one preferred embodiment, the TMF file 40 is streamed across a network 20. That network 20 could be, for example, the Internet. Alternatively, the TMF files 40 are stored on a storage medium 18. That storage medium 18 could be a portable storage medium such as a CD-ROM, hard disk drive, or floppy disk. Thus, the TMF files 40 can be transferred from one point to another using portable storage media.

Once a movie file 40 has been created and transferred to a viewing terminal 22, a special interpreter 24, which sits between the file 40 and the graphics display tool 26, can then be used to translate the movie file commands back into the correct type of graphics instructions, and populate the calls with the necessary arguments and data. The viewer then feeds the graphics instructions to the graphics display tool 26 such as a graphics rendering tool, which displays the images. Thus the TMF file 40 can be translated into a form that will instruct the display tool 26 on how to display the images.

Figure 5:
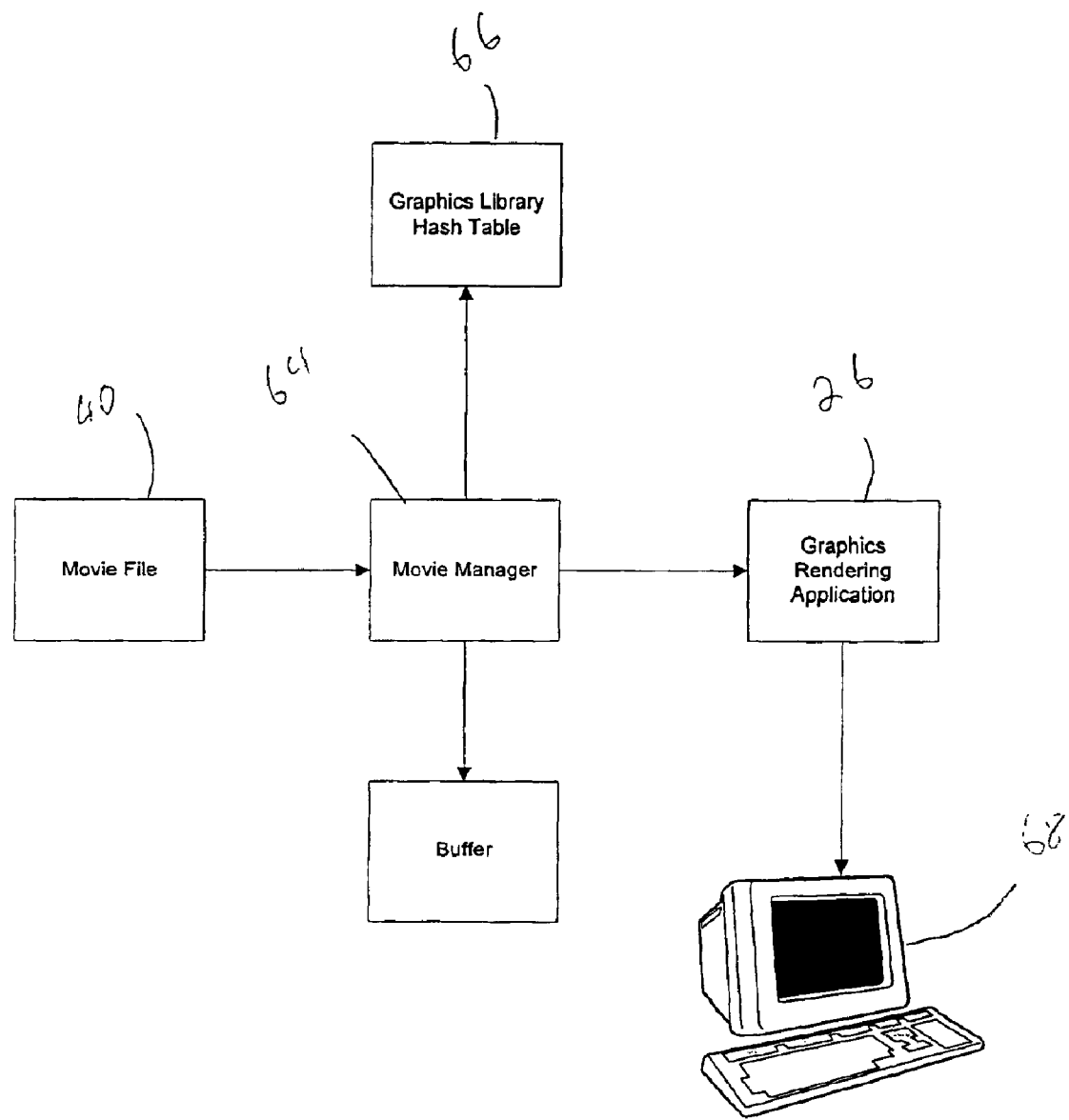
FIG. 5 is a block diagram of an apparatus for viewing 3-D imagery in accordance with a preferred embodiment of the present invention.
Figure 6:
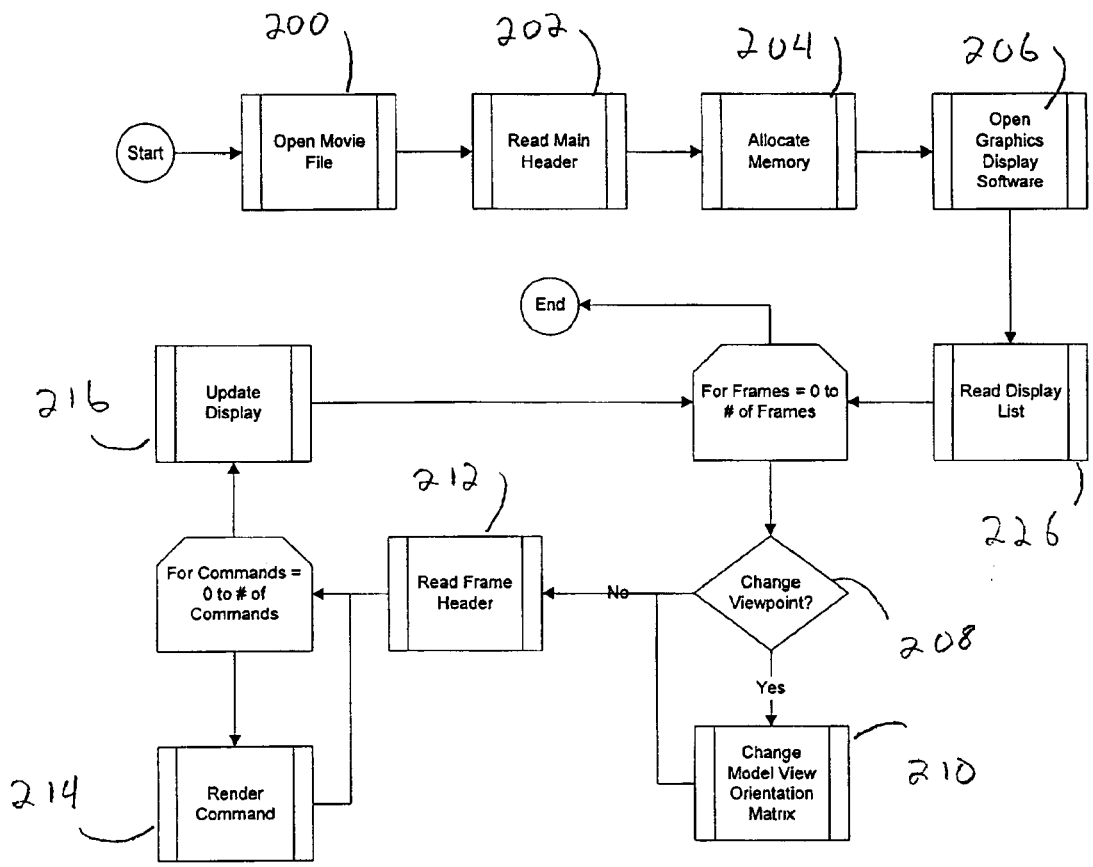
FIG. 6 is a flowchart of a method of viewing 3-D imagery in accordance with the present invention.

In a preferred embodiment of the present invention, with reference to FIGS. 5 and 6, a movie manager 64 translates each movie file command into a graphics instruction by referencing the movie file command on a hash table 66 and sending the graphics instruction to the graphics display software 26. More specifically, The movie manager 64 will first open a movie file 40, as in step 200, and read the main header, as in step 202. The main header gives the manager basic information about the imagery to be rendered, such as the size, number of frames, etc. With this information, the manager 64 allocates necessary memory as in step 204. The graphics display software 26 is then invoked, as in step 206. For each frame, the graphics display software 26 first checks to see if a viewpoint change has been requested, as in step 208. If so, the viewpoint is changed by changing a model view orientation matrix as in step 210. The manager 64 then reads frame header, as in step 212. The frame header contains basic information about the frame, such as the number of commands. Each command in the frame is then translated and rendered, as in step 214. The display 68 is then updated with the new frame, as in step 216.

Figure 7:
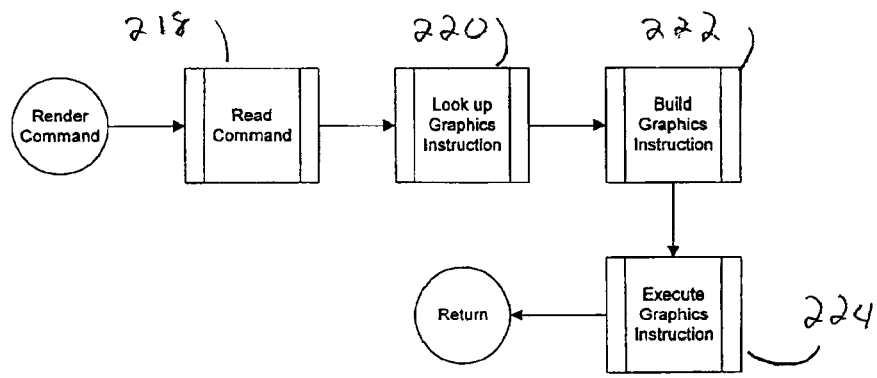
FIG. 7 is a flowchart of a method of rendering 3-D movie file commands in accordance with a preferred embodiment of the present invention.

In a preferred embodiment of the present invention, to render each command, as in step 214, the movie manager 64 first reads the command, as in step 218 of FIG. 7. The command is broken down into an integer corresponding to a graphics instruction and the necessary arguments. With further reference to FIG. 7, the manager 64 uses the integer to look up the corresponding graphics instruction template from the hash table 66, as in step 220. The manager 64 then builds the graphics instruction by populating the template with the arguments, as in step 222. The call is then executed by the graphics display tool, as in step 224.

In a preferred embodiment, the movie file 40 contains the display list 60, which includes information that will be rendered with every image. With further reference to FIGS. 5 and 6, the movie manager 64 reads the display list information before rendering the frames, as in step 226, and includes it when giving information to the display software 26.

As one skilled in the art will appreciate, the method and apparatus for storing and viewing a sequence of 3-D images of the present invention can be used for a multitude of graphics library platforms. Graphics instructions from different graphics libraries, such as OpenGL, PHIGS, and StarBase could all be supported. To represent graphics calls from each library, it is necessary to create a library of commands that represent each call by an integer. The viewer which translates the file into graphics instructions would also need to be equipped with the ability to translate instructions from the specific graphics library. Furthermore, the computer on which the file is viewed must have the specified graphics library and any necessary display tools.

The 3-D movie file 40 resulting from the method of the present invention, when played back, can be viewed from a multitude of vantage points. This is possible because it stores instructions for use by a display or rendering tool. Therefore, the present invention can leverage the benefits inherent in using rendering tools to render series of images that include graphics instructions. Although other file formats such as VRML include sufficient information to instruct a rendering tool to render a 3-D image, unlike VRML, the output of the present invention is a binary file format and not an ASCII file format, and as a result, it can take up considerably less storage space and transmission bandwidth. Furthermore, because the method of the present invention automatically captures the graphics instructions, it is unnecessary to learn a new language to instruct a graphics library, as is necessary in using file formats such as VRML. Finally, graphics languages such as VRML do not map commands to graphics instructions on a one to one basis. The output file of the present invention, on the other hand, directly map the commands to corresponding graphics instructions on a one to one basis.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

Header Description

```
typedef struct {
    TMFDword dwByteSizeOfHeader;
    TMFDword dwMaxCommandSize
    TMFLong dwOperatingSys;
    TMFLong dwVers;
    TMFUint uintFrames;
    TMFDword dwFlags;
    TMFDword dwStreams;
    TMFDword dwCaps;
    TMFDword dwAdditionalBlocks
    TMFDword dwSizeOfObjectSpace;
    TMFView ObjectSpace;
    TMFDword dwListCount
    TMFDword dwSizeOfRenderStates;
    TMFGraphicState RenderStates;
}TMFFileInfo;
``` dwByteSizeOfHeader:

The dwByteSizeOfHeader variable contains the size of the TMFFileInfo structure in TMFBytes. One TMFByte is equivalent to the size of a single character.

dwMaxCommandSize:

The dwMaxCommandSize variable contains the size of the largest command and it's corresponding data. This variable is used to tell the player how much memory is required to handle the largest command that is encoded into the TMF file.

dwOperatingSys:

The dwOperatingSys variable defines the operating system that was used to produce the TMF file.

dwVers:

The dwVers variable identifies the version of the recording library used to produce the TMF file.

uintFrames:

The variable uintFrames identifies the number of frames that has been stored in the TMF file.

dwFlags:

The dwFlags variable contains information about different TMF File states and has not yet been fully defined.

dwStreams:

The variable dwStreams contains the count of the number of streams that are stored per frame. A stream can be sound, graphics, or any other form of support stream format.

dwCaps:

The dwCaps variable contains information regarding the capabilities of the file. Can it be edited, etc. . . .

dwAdditionalBlocks:

The dwAdditionalBlocks variable identifies the number of additional data blocks that may exist in the header definition at the beginning of the file. As the file format evolves additional blocks may be required to define the file.

dwSizeOfObjectSpace:

The variable dwSizeOfObjectSpace defines the size in TMFBytes of the ObjectSpace data structure.

ObjectSpace:

The ObjectSpace variable is a structure that contains information about the model and the initial view orientation.

dwListCount:

The number of display list blocks stored at the beginning of the file. Once a frame has been created the user is not allowed to create display lists.

dwSizeOfRenderStates:

The variable dwSizeOfRenderStates defines the size in TMFBytes of the RenderStates data structure.

RenderStates:

The RenderStates data structure contains information about render state that was used when the file was produced. For example: shading, z buffering, double side shading, etc. . . . .

What is claimed is:

1. A computer-implemented method of producing a 3-D image file, the method comprising the steps of:

generating graphics instructions which define image-related characteristics of a first 3-D image frame, wherein a graphics instruction can be used to instruct a display software having a rendering tool to render a characteristic of a 3-D image frame;

generating image commands corresponding to the graphics instructions, the image commands including graphics instruction reference data and graphics instruction argument data;

transferring the image commands to an output 3-D image file;

rendering a sequence of 3-D image frames with the rendering tool using the instructive information stored in the output 3-D image file and matching up the image commands with corresponding graphics instructions;

wherein the output file includes information to instruct the display software to display the original 3-D image frame so as to be viewable from multiple viewpoints.

2. The method of claim 1, the method further comprising the steps of:

generating image commands corresponding to the graphics instructions which represent a second 3-D image frame; and transferring the image commands representing the second 3-D image frame to the output 3-D image file;

wherein the output file includes information to instruct the display software to display the first 3-D image frame and the second 3-D image frame into a sequence of 3-D image frames.

3. The method claim 1, further comprising the step of linking a library including a set of procedures containing storage information and rendering information for each of the graphics instructions.

4. The method of claim 1, further comprising the step of translating each of the image commands into the graphics instructions concurrently with the storage of the image commands.

5. The method of claim 1, further comprising the step of streaming the output 3-D image file across a network.

6. The method of claim 5, wherein the network is the Internet.

7. The method of claim 5, further comprising the step of compressing the output 3-D image file before it is streamed across the network.

8. A method of viewing a 3-D imagery, the method comprising:

(a) reading a movie file command, the movie file command containing graphics instruction reference data and graphics instruction argument data;

(b) using the movie file command to reference a corresponding graphics library instruction template;

(c) building a graphics instruction by using information contained in a main file header and linking the graphics instruction argument data to the graphics library instruction template;

(d) executing the graphics instruction using a display software; and (e) repeating steps (a) through (d) for a plurality of movie file commands;

wherein the graphics instruction contains information for rendering a characteristic of a 3-D image so as to be viewable from multiple viewpoints.

9. The method of claim 8, wherein a frame is comprised of the plurality of movie file commands.

10. The method of claim 8, further comprising the steps of reading a the main file header.

11. The method of claim 8, further comprising the step of reading at least one characteristic from a display list, the display list containing at least one characteristic to be rendered in a plurality of image frames.

12. A memory for storing data, the data including information for instructing a display software to display a characteristic of a 3-D image so as to be viewable from multiple viewpoints, the memory comprising:

a main header containing information concerning a plurality of 3-D images;

a graphics instruction data field that contains reference information corresponding to a single graphics instruction, the single graphics instruction containing information for instructing the display software to display a characteristic of the 3-D image; and an argument data field defining at least one argument, the argument data field containing data to be used by the single graphics instruction in generating the 3-D image characteristic.

13. The memory of claim 12, further comprising a command size data field defining a size of a graphics rendering command and a 3-D movie command including graphics instruction reference information and graphics instruction data.

14. The memory of claim 13, further comprising:

at least one frame, the frame including at least one set of command size, graphics call, and argument fields; and a frame header stored in the memory corresponding to a specific frame, the frame header including general information concerning the specific frame.

15. The memory of claim 14, wherein the main header comprises:

an argument type data field stored in the memory defining an argument type; and an argument size data field stored in the memory defining an argument size.

16. The memory of claim 14, further comprising a display list stored in the memory, wherein the display list includes at least one data field containing a characteristic that will be rendered, in each of the frames.

17. The memory of claim 12, wherein the argument data field comprises an argument size data field defining a size of the argument.

18. The memory of claim 17, wherein the argument data field includes both data defining the size of the argument and data defining a type of the argument.

19. The memory of claim 17, wherein the argument data field further comprises an argument type data field defining a type of the argument.

20. An apparatus producing a 3-D image file, the apparatus comprising:

a translation application for translating a data set into graphics instructions, the data set containing information about the contents of at least one 3-D image, and each graphics instruction containing information for instructing a display software to display a characteristic of a 3-D image;

a graphics converter for converting the graphics instructions into movie file commands, each movie file command including a reference to a corresponding graphics instruction and graphics instruction argument data; and a movie file recorder for recording a plurality of movie file commands in an output 3-D image file;

a buffer, wherein the movie file commands are first written to the buffer and subsequently transferred from the buffer to the output 3-D image file;

wherein the output 3-D image file includes information for instructing a rendering software to render a 3-D imagery, so as to be viewable from multiple viewpoints and further includes image frame, the image frames including a plurality of movie file commands and wherein the movie file commands are written to the buffer until a complete frame is written to the buffer after which the frame is transferred from the buffer to the output file.

21. The apparatus of claim 20, wherein the movie file commands include integer representations of graphics instructions.

22. The apparatus of claim 20, further comprising graphics display software to display graphics, instructions, wherein the graphics converter passes graphics instructions to the display software simultaneously with passing movie file commands to the movie file recorder.

23. The apparatus of claim 22, wherein the graphics converter first converts the graphics instructions into movie file commands, and subsequently converts the movie file commands into the corresponding graphics instructions to be passed to the display software.

24. The apparatus of claim 23, wherein the display software includes a graphics rendering tool.

25. An apparatus for viewing a 3-D imagery, the apparatus comprising:

a graphics library hash table for referencing a movie file command to a graphics instruction, the movie file command containing a reference to a graphics instruction and argument data for the graphics instruction, the graphics instruction including information for instructing a display software to display a characteristic of a 3-D image so as to be viewable from multiple viewpoints, and the hash table including references to a plurality of graphics instructions and corresponding movie file commands, and the movie manager translates a plurality of movie file commands into corresponding graphics instructions;

a movie manager connected to the display software for translating a movie file command into a graphics instruction by referencing the corresponding graphics instruction on the graphics library hash table; and the display software for displaying the graphics instruction.

26. The apparatus of claim 25, wherein the reference to the graphics instruction is an integer, and wherein that integer is referenced in the corresponding movie file command.

27. The apparatus of claim 25, wherewith display software includes graphics rendering tool.

28. The apparatus of claim 27, wherein the graphics rendering tool renders a plurality of graphics instructions in a sequence.

29. The apparatus of claim 25 wherein the graphics instructions are OpenGL instructions.

30. A computer data signal for instructing a display software to display a characteristic of a 3-D image so as to be viewable from multiple viewpoints, the signal embodied in a carrier wave, the signal comprising:

a main header containing information concerning a plurality of 3-D images;

a graphics instruction data field that contains reference information corresponding to a single graphics instruction, the single graphics instruction containing information for instructing the display software to display a characteristic of the 3-D image; and an argument data field defining at least one argument, the argument containing data to be used by the single graphics instruction in generating the 3-D image characteristic.

31. The signal of claim 30, further comprising a command size data field defining a size of a graphics rendering command and a 3-D movie command including graphics instruction reference information and graphics instruction data.

32. The signal of claim 31, further comprising:

at least one frame, the frame including at least one set of command size, graphics call, and argument fields; and a frame header corresponding to a specific frame, the frame header including general information concerning the specific frame.

33. The signal of claim 32, wherein the header comprises:

an argument type data defining an argument type; and an argument size data field defining an argument size.

34. The signal of claim 32, further comprising display list information, wherein the display list information includes at least one data field containing a characteristic that will be rendered in each of the frames.

35. The signal of claim 30, wherein the argument data field comprises an argument size data field defining a size of the argument.

36. The signal of claim 35, wherein the argument size field includes both data defining the size of the argument and data defining a type of the argument.

37. The signal of claim 35, wherein the argument field further comprises an argument type data field defining a type of the argument.

* * * * *